United States Patent [19]
Underwood

[11] Patent Number: 5,857,907
[45] Date of Patent: Jan. 12, 1999

[54] EXPANDABLE AND RETRACTABLE UNLOADER

[75] Inventor: Mark R. Underwood, Burr Oak, Kans.

[73] Assignee: Deere & Company, Moline, Ill.

[21] Appl. No.: 806,841

[22] Filed: Feb. 26, 1997

[51] Int. Cl.⁶ .................................................. A01F 12/46
[52] U.S. Cl. ........................... 460/114; 460/119; 414/505
[58] Field of Search ..................................... 460/114, 115, 460/119, 149, 150; 414/503, 504, 505

[56] References Cited

U.S. PATENT DOCUMENTS

| | | | |
|---|---|---|---|
| 4,169,536 | 10/1979 | Seem .................................... | 414/505 X |
| 5,407,390 | 4/1995 | Carney et al. ........................ | 460/119 |
| 5,498,119 | 3/1996 | Faivre ................................... | 414/505 X |
| 5,498,215 | 3/1996 | Underwood et al. . | |
| 5,509,854 | 4/1996 | Underwood . | |

FOREIGN PATENT DOCUMENTS

| | | | |
|---|---|---|---|
| 4004812 | 1/1992 | Japan ..................................... | 460/114 |
| 4141021 | 5/1992 | Japan ..................................... | 460/114 |

*Primary Examiner*—Terry Lee Melius
*Attorney, Agent, or Firm*—James E. Bradley

[57] ABSTRACT

A grain combine threshes grain from crop and deposits the grain in a grain bin. A discharge conveyor is mounted to the grain bin. At the distal end of the discharge conveyor is a discharge for expelling the grain. A telescopic, secondary unloader which is smaller than the discharge conveyor is located immediately below the discharge. The secondary unloader may be variably extended beyond the end of the discharge, or retracted when it is not in use. The secondary unloader is divided into grain conveying and paddle return sections which are formed from a partition which extends along the length of the secondary unloader. Paddles are provided in each section and are joined to a continuous flexible linkage mounted around sprockets. The secondary unloader uses hydraulic cylinders to extend and retract. When the secondary unloader is retracted, it is recessed inward from the distal end of the discharge conveyor which operates in a conventional manner by discharging grain from the discharge. When the secondary unloader is in an extended position, the reach of the discharge conveyor is extended by the length of the secondary unloader. In the extended position, grain is expelled from the discharge and falls into the grain conveying sections at the proximal end of the secondary unloader. The secondary unloader then conveys the grain to its distal end where the grain is expelled.

7 Claims, 3 Drawing Sheets

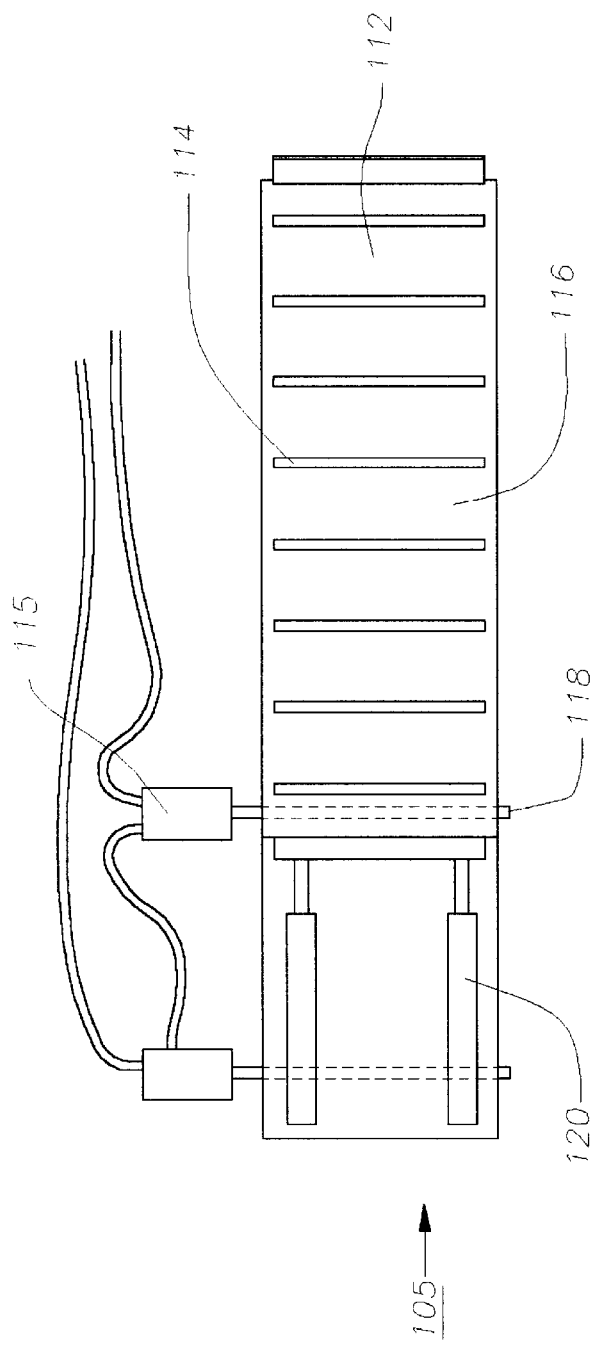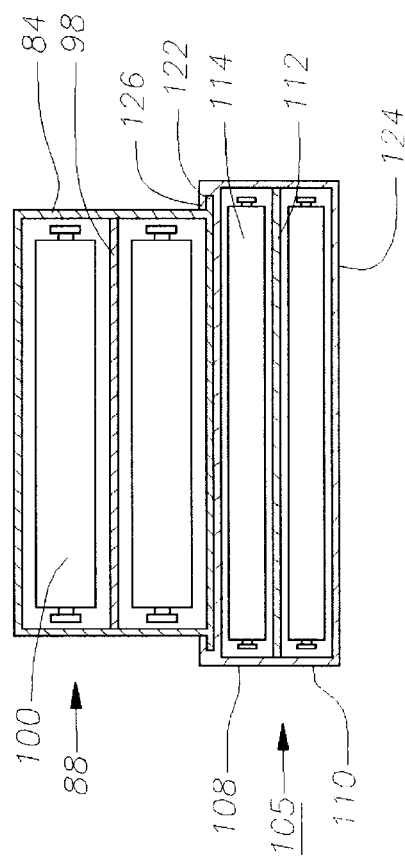

5,857,907

EXPANDABLE AND RETRACTABLE UNLOADER

TECHNICAL FIELD

This invention relates in general to agricultural equipment, and in particular to a grain harvesting combine.

BACKGROUND ART

Prior art methods of unloading grain from the grain bin of a combine or a similar piece of agricultural equipment usually involve providing an unloading chute with the grain bin. The unloading chute typically has an intake located at or near the bottom of the grain bin so that grain is continuously removed even as the level of the grain drops within the grain bin. A screw-type grain auger or grain conveyor is typically used and housed within the unloading chute to convey the grain up and away from the grain bin onto the grain bed of a truck or trailer. Generally, prior art grain unloaders may be pivotally rotated from a storage position alongside the grain bin to a discharge position away from the grain bin.

The distance from the distal end of the unloader to the bin is fixed. There are a number of problems associated with fixed-length unloaders. If the length of the unloader is too short, it is difficult to position the truck bed under the distal end of the unloader, particularly if the combine continues cutting grain while unloading. If the length of the unloader is too long, the unloader is difficult to store during nonuse. Also, in rough grain fields, the extreme twisting and vibration encountered during use is amplified along the length of unloaders, thereby increasing the risk of danger and premature failure.

DISCLOSURE OF THE INVENTION

A combine having a frame is mounted on wheels. The combine is provided with an engine for powering equipment and driving the combine. A cab located in the forward portion of the combine allows an operator to control and drive the combine. Located at the forward end of the combine is a header assembly. The header assembly has a cutting element for cutting crop. An auger delivers the crop to the header assembly where it is conveyed upward on a feed belt. The cut crop from the feed belt is introduced into a threshing assembly which consists of a threshing rotor rotating within a threshing drum. The grain is forced through apertures in the threshing drum and then through a sieve with apertures. A grain pan is located below the threshing assembly and directs grain from the threshing drum onto the sieve.

A conveyor with a plurality of paddles elevates the clean grain from the sieve where it is delivered to an auger which conveys the grain to a grain bin. A primary discharge conveyor is mounted to the grain bin. The discharge conveyor has a housing with a vertical lower section and a horizontal upper section. An intake is located at the bottom of the grain bin. At the distal end of the conveyor housing is a discharge for discharging grain which is conveyed through the conveyor housing.

A telescopic, secondary conveyor or unloader is located immediately below the discharge. The secondary unloader is smaller than the discharge conveyor and is secured to the lower side of upper section. The secondary unloader is a grain conveyor system that is similar to the primary conveyor. The secondary unloader may be variably extended beyond the end of the discharge, or retracted to a storage position beneath the upper section of the primary conveyor when it is not in use. The secondary unloader is divided into grain conveying sections and paddle return sections which are formed from a partition which extends along the length of the secondary unloader. Flat, rigid paddles are provided in each section. The paddles are joined to a continuous flexible linkage mounted around sprockets.

The secondary unloader utilizes hydraulic cylinders to telescopically extend or retrieve. When the secondary unloader is in a retracted position, it is recessed inward from the distal end of the discharge conveyor which operates in a conventional manner by discharging grain from the discharge. When the secondary unloader is in an extended position, the reach of the discharge conveyor is extended by the length of the secondary unloader. In the extended position, grain is expelled from the discharge and falls into the grain conveying sections at the proximal end of the secondary unloader. The secondary unloader conveys the grain to a secondary discharge at its distal end where the grain is expelled.

BRIEF DESCRIPTION OF DRAWINGS

FIG. 3 is a partial top view of a secondary conveyor constructed in accordance with the invention.

FIG. 4 is sectional view of the upper portion of the unloading system taken along the line 4—4 in FIG. 2.

BEST MODE FOR CARRYING OUT THE INVENTION

Figure 1:
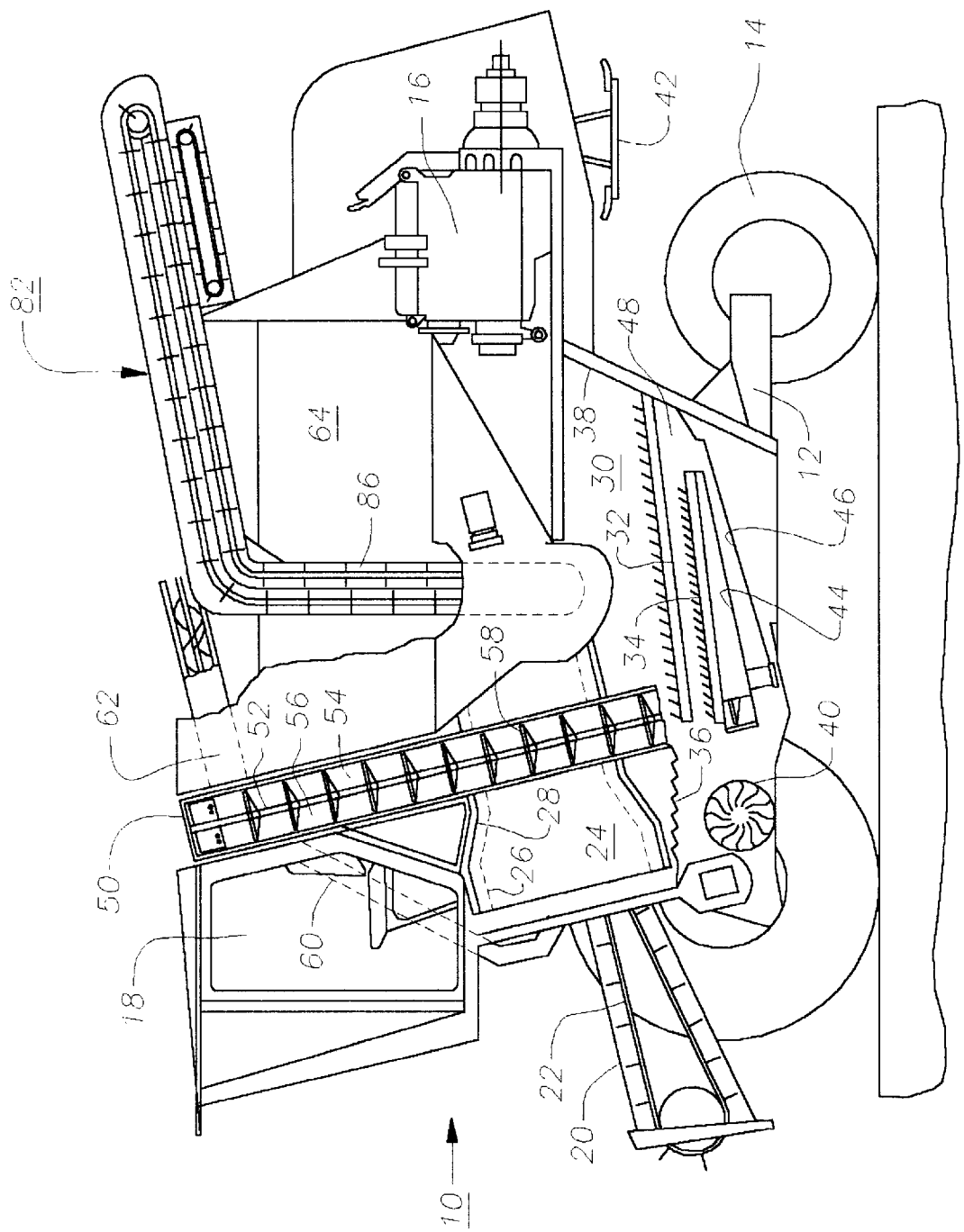
FIG. 1 is a side view of a combine with an unloading system, which is partially sectioned to show internal components and is constructed in accordance with the invention.

A combine 10 having a frame 12 is mounted on wheels 14 and shown in FIG. 1. The combine 10 is provided with an engine 16 for powering equipment and driving the combine 10. A cab 18 located in the forward portion of the combine 10 allows an operator to control and drive the combine 10.

Located at the forward end of the combine 10 is a header assembly 20. The header assembly 20 is typically provided with a reel and reciprocating blade or cutting element (not shown) for cutting crop. An auger (not shown) delivers the crop to the center of the header assembly 20 where it is conveyed upward on a conveyor or feed belt 22. The cut crop from the feed belt 22 is introduced into the forward end of a threshing assembly 24. The threshing assembly 24 consists of a threshing rotor 26 housed within a threshing drum 28. The threshing rotor 26 rotates within the threshing drum 28 where rasp bars (not shown) located on the exterior of the threshing rotor 26 thresh the cut crop and force grain through apertures located in the threshing drum 28.

A sieve section 30 is located below the threshing assembly 24. The sieve section 30 consists of an upper sieve 32 and a lower sieve 34. Sieves 32, 34 are flat plates or trays having a number of small apertures through which grain can fall. A grain pan 36 located below the forward end of the threshing assembly 24 directs grain from the threshing drum 28 and directs it onto the sieves 32, 34. The sieves 32, 34 are mounted within a sieve housing 38 and may be shaken or reciprocated by shaker means (not shown) in order to facilitate passing of clean grain through the apertures of the sieves 32, 34. A fan or blower 40 located forward of the sieves 32, 34 blows air upward and rearward through sieves 32, 34 and through an opening or window in the rearward portion of the sieve housing 38. Chaff and other lightweight crop residue are thus blown rearward to a chaff spreader 42 located at the rearward end of the combine 10 for spreading crop residue behind the combine 10. Located below the lower sieve 34 is a grain floor 44 which is sloped downward from the rearward end of the lower sieve 34 to the forward end. The grain floor 44 extends across the sieve housing 38 on either side of the combine 10.

A tailings or grain returns floor 46 extends below the upper and lower sieves 32, 34 and below the grain floor 44. The returns floor 46 slopes downward from the rear of the sieve housing 38. An open portion or opening 48 between the rear of the sieve housing 38 and the rear of the sieves 32, 34 and grain floor 44 allows grain returns to fall from the rear of the sieves 32, 34 to the returns floor 46.

A conveyor 50, constructed similarly to that described in U.S. Pat. No. 5,496,215, is provided with the combine 10. The conveyor 50 has a partition 52 which divides the interior of the conveyor 50 into a grain returns compartment 54 and a clean grain compartment 56. Mounted within the conveyor 50 are a plurality of paddles or buckets 58 which force grain upwards through the clean grain compartment 56 and grain returns compartment 54. Grain returns are received from the grain returns floor 46 through an opening located in the lower portion of the conveyor 50 into the grain returns compartment 54. Similarly, clean grain from the grain floor 44 is received into the clean grain compartment 56 through an opening similarly located. The conveyor 50 elevates the clean grain where it is delivered to an auger 62 which conveys the clean grain to a grain bin 64. Grain returns from the grain returns compartment 54 is elevated and is returned to the threshing assembly 24 by means of a returns chute 60.

Auger 62 is mounted above the grain bin 64 and is directed rearward, extending substantially midway over the grain bin 64. The grain bin 64 is sized to accommodate a substantial volume of clean grain without affecting the operation of the combine 10.

Figure 2:
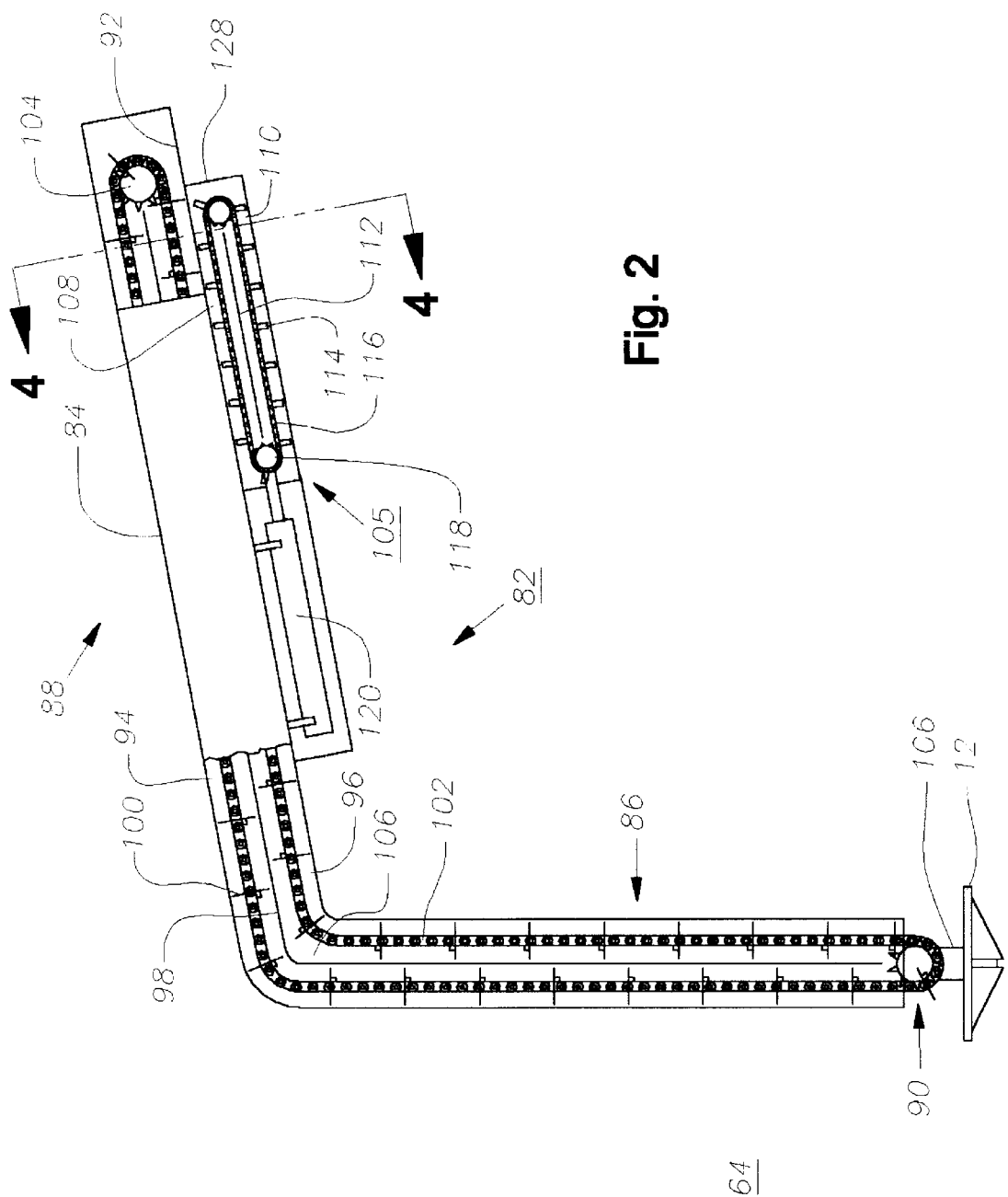
FIG. 2 is a side sectional view of the unloading system of FIG. 1.

Referring to FIG. 2, a discharge conveyor 82 is mounted to the grain bin 64 and supported by the frame 12. The discharge conveyor 82 has an L-shaped discharge conveyor housing 84 having a lower section 86 and an upper section 88. The lower section 86 of the discharge conveyor housing 84 is substantially vertical and extends into grain bin 64, terminating in a lower end having an opening or intake 90. The intake 90 should be located at the very bottom of grain bin 64 to facilitate complete removal of the grain. At the distal or opposite end of the conveyor housing 84, on the upper section 88, is a discharge 92 for discharging grain which is conveyed through the conveyor housing 84. The upper section 88 is substantially horizontal.

The discharge conveyor housing 84 is divided into a grain conveying compartment 94 on an upper side and a paddle return compartment 96 on a lower side which are formed from a partition 98 which extends substantially the entire length of the conveyor housing 84. Flat, rigid paddles 100 are provided in each of the compartments 94, 96. The paddles 100 are configured to conform to the interior of the compartments 94, 96 and are positioned generally perpendicular to the walls of the conveyor housing 84 and are spaced apart at intervals throughout the interior of the conveyor housing 84. Scoops or buckets could also be used in place of paddles 100.

The paddles 100 are joined to a continuous flexible linkage 102 mounted around sprockets 104. The linkage 102 is formed from a roller chain but may also be formed from other suitable means such as a drive belt mounted around rollers or pulleys which allow the belt to be continuously passed through the interior of the conveyor housing 84. The discharge conveyor 82 is mounted to the grain bin by a vertical axle 106 which extends through the lower section 86 of the conveyor housing 84. This allows the discharge conveyor 82 to be pivoted between an inward position and an outward position. In the inward position, the upper section 88 and discharge 92 are located adjacent to grain bin 64. In the outward position, discharge 92 is extended away from grain bin 64 for discharging grain away from combine 10.

Referring to FIGS. 2, 3 and 4, a telescopic, secondary conveyor or unloader 105 is located immediately below discharge 92. Secondary unloader 105 is smaller than discharge conveyor 82 and is secured to the lower side of upper section 88. Secondary unloader 105 is a grain conveyor system that is similar to conveyor 82. Secondary unloader 105 may be variably extended beyond the end of discharge 92, or retracted to a storage position beneath upper section 88 when it is not in use. Secondary unloader 105 is divided into grain conveying sections 108 and paddle return sections 110 which are formed from a partition 112 which extends substantially the entire length of secondary unloader 105. Flat, rigid paddles 114 are provided in each of the sections 108, 110. The paddles 114 are positioned generally perpendicular to the walls of the secondary unloader housing 124 and are spaced apart from one another. Scoops or buckets could also be used in place of paddles 114.

The paddles 114 are joined to a continuous flexible linkage 116 mounted around sprockets 118. The linkage 116 is formed from a roller chain but may also be formed from other suitable means such as a drive belt mounted around rollers or pulleys which allow the belt to be continuously passed below the discharge 92 in conveyor housing 84. Paddles 114 and linkage 116 are driven by an electric motor 115.

Secondary unloader 105 utilizes hydraulic cylinders 120 to telescopically extend or retrieve secondary unloader 105. As shown in FIG. 4, conveyor housing 84 has a lower outer flange 122 which extends along each side. Secondary unloader housing 124 has an upper inner flange 126 which slidingly engages flange 122 as secondary unloader 105 is moved. When secondary unloader 105 is in a retracted position (FIG. 2), it is recessed inward from the distal end of discharge conveyor 82 which operates in a conventional manner by discharging grain from discharge 92. When secondary unloader 105 is in an extended position (not shown), the reach of discharge conveyor 82 is extended by the length of secondary unloader 105. In the extended position, grain is expelled from discharge 92 and falls into grain conveying sections 108 at the proximal end of secondary unloader 105. The upper side of secondary unloader 105 has an opening for receiving the grain that falls from discharge 92. Secondary unloader 105 conveys the grain to secondary discharge 128 at its distal end where the grain is expelled.

The invention has several advantages. By utilizing a telescopic secondary unloader in the unloading system, the primary unloader can be shorter than conventional unloaders. A shorter primary unloader provides a more compact profile during the shipping and storage of the combine. In rough grain fields, this design may also increase the durability of the unloader as extreme twisting and vibration is reduced by reducing the length and profile of the unloader extending outside of the grain bin. Conversely, the primary unloader may be the same length as conventional unloaders. With the additional length provided by the telescopic secondary unloader, the unloading system has an even greater range without requiring additional space to accommodate the secondary unloader when it is not in use. In either case, the length of the unloader may be adjusted to meet the requirements of each job.

While the invention has been shown in only one of its forms, it should be apparent to those skilled in the art that it is not so limited, but is susceptible to various changes without departing from the scope of the invention.

I claim:

1. A grain harvesting combine, comprising in combination:

a grain bin;

a grain unloading system for transporting grain out of the bin, the unloading system having a discharge chute located outside of the bin; and a variably telescopic discharge member located below, secured to and extending in the same direction as the discharge chute for receiving grain therefrom and being movable between a retracted position and an extended position relative to the discharge chute.

2. The grain harvesting combine of claim 1 wherein the discharge member and the discharge chutes are conveyors, each having a plurality of paddles moved by a flexible linkage.

3. The grain harvesting combine of claim 1 wherein the unloading system is rotatable from a storage position alongside the bin to an offloading position away from the bin during use.

4. A grain harvesting combine, comprising in combination:

a grain bin;

a grain unloading system for transporting grain out of the bin, the unloading system having a discharge chute located outside of the bin; and a variably telescopic discharge member located below the discharge chute, the discharge member being secured to the unloading system for receiving grain from the discharge chute and being movable between a retracted position and an extended position relative to the discharge chute; and wherein when the discharge member is in the retracted position, the discharge member is recessed inward from a distal end of the discharge chute.

5. A grain harvesting combine having a grain bin and a grain unloading system for transporting grain out of the bin, the unloading system comprising in combination:

a primary conveyor for emptying the bin of grain, the primary conveyor having paddles which are moved through a housing on a linkage, a proximal end and a distal end with a lower side, the proximal end being located at a lower end of the bin, the distal end being located outside of the combine; and a telescopic secondary conveyor secured to the lower side of the distal end in the same direction as the primary conveyor, the unloading system having a retracted position when the secondary conveyor is fully retracted, and an extended position when the secondary conveyor is variably extended past the distal end of the primary conveyor, the secondary conveyor being of a fixed length and movable relative to the primary conveyor between the retracted and extended positions.

6. The grain unloading system of claim 5 wherein the primary unloader is rotatable from a storage position alongside the bin to an offloading position away from the bin during use.

7. A grain harvesting combine having a grain bin and a grain unloading system for transporting grain out of the bin, the unloading system comprising in combination:

a primary unloader for emptying the bin of grain, the primary unloader having a proximal end and a distal end with a lower side, the proximal end being located at a lower end of the bin, the distal end being located outside of the combine; and a telescopic secondary unloader secured to the lower side of the distal end, the unloading system having a retracted position when the secondary unloader is fully retracted, and an extended position when the secondary unloader is variably extended past the distal end of the primary unloader; and wherein when the secondary unloader is in the retracted position, the secondary unloader is recessed inward from a distal end of the primary unloader.

* * * * *